United States Patent
Usui et al.

(10) Patent No.: US 12,357,963 B2
(45) Date of Patent: Jul. 15, 2025

(54) YFI-STRUCTURE ZEOLITE COMPOSITION, HYDROCARBON ADSORBENT, AND METHOD FOR ADSORBING HYDROCARBONS

(71) Applicant: TOSOH CORPORATION, Yamaguchi (JP)

(72) Inventors: Toyohiro Usui, Yamaguchi (JP); Keita Nakao, Yamaguchi (JP); Naoto Nakazawa, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 545 days.

(21) Appl. No.: 17/915,360

(22) PCT Filed: Mar. 30, 2021

(86) PCT No.: PCT/JP2021/013610
§ 371 (c)(1),
(2) Date: Sep. 28, 2022

(87) PCT Pub. No.: WO2021/200990
PCT Pub. Date: Oct. 7, 2021

(65) Prior Publication Data
US 2023/0234023 A1    Jul. 27, 2023

(30) Foreign Application Priority Data
Mar. 31, 2020 (JP) .................. 2020-064910

(51) Int. Cl.
| | | |
|---|---|---|
| *B01D 53/02* | (2006.01) | |
| *B01D 53/92* | (2006.01) | |
| *B01J 20/04* | (2006.01) | |
| *B01J 20/18* | (2006.01) | |
| *B01J 20/32* | (2006.01) | |

(52) U.S. Cl.
CPC ............ *B01J 20/186* (2013.01); *B01D 53/02* (2013.01); *B01D 53/92* (2013.01); *B01J 20/04* (2013.01); *B01J 20/3204* (2013.01); *B01J 20/3236* (2013.01); *B01D 2253/1085* (2013.01); *B01D 2257/702* (2013.01); *B01D 2258/01* (2013.01); *B01J 2220/42* (2013.01)

(58) Field of Classification Search
CPC .......... B01D 53/02; B01D 53/92; B01J 20/04; B01J 29/06; B01J 20/18; B01J 20/32
See application file for complete search history.

(56) References Cited

U.S. PATENT DOCUMENTS 6,617,276 B1 * 9/2003 Ballinger ............. B01D 53/944
502/64

FOREIGN PATENT DOCUMENTS

| FR | 2133851 A1 | 12/1972 |
|---|---|---|
| JP | 7-185326 A | 7/1995 |
| JP | 2001-293368 A | 10/2001 |
| JP | 2018-089571 A | 6/2018 |
| JP | 2019-093382 A | 6/2019 |

OTHER PUBLICATIONS

Supplementary European Search Report dated Jun. 10, 2024 in European family member application No. 21 77 9275.
International Search Report and Written Opinion of the International Searching Authority Issued in International Patent Application No. PCT/JP2021/013610, dated Jun. 22, 2021, along with an English translation thereof.
International Preliminary Report on Patentability issued in Patent Application No. PCT/JP2021/013610, dated Sep. 29, 2022.

* cited by examiner

*Primary Examiner* — Sharon Pregler
(74) *Attorney, Agent, or Firm* — GREENBLUM & BERNSTEIN, P.L.C.

(57) ABSTRACT

A composition is provided that has heat resistance sufficient for use as a hydrocarbon adsorbent and desorbs hydrocarbons slowly with respect to an increase in temperature. The composition includes an alkali metal and a zeolite having a YFI structure. A content of the alkali metal is 1 to 40 mass % based on a total mass of the composition, and a content of the zeolite having a YFI structure is 99 to 60 mass % based on the total mass of the composition.

8 Claims, No Drawings

YFI-STRUCTURE ZEOLITE COMPOSITION, HYDROCARBON ADSORBENT, AND METHOD FOR ADSORBING HYDROCARBONS

TECHNICAL FIELD

The present disclosure relates to a YFI-structure zeolite composition, a hydrocarbon adsorbent and a method for adsorbing hydrocarbons.

BACKGROUND ART

Exhaust gases emitted from internal combustion engines used in vehicles, such as automobiles and watercrafts, contain large quantities of hydrocarbons. The hydrocarbons emitted from internal combustion engines are purified with a three-way catalyst. A temperature environment necessary for the three-way catalyst to function is 200° C. or higher. Accordingly, when a temperature is in a range in which the three-way catalyst does not function, for example, during the so-called cold start period, hydrocarbons are adsorbed onto a hydrocarbon adsorbent, and the hydrocarbons are released from the adsorbent when the temperature reaches the range in which the three-way catalyst begins to function. The hydrocarbons are then decomposed and purified by the three-way catalyst. Hydrocarbon adsorbents typically use a zeolite-containing composition. Regarding the composition, if adsorbed hydrocarbons are desorbed at a time at a specific temperature, an increased load is imposed on the three-way catalyst, which is located downstream. Accordingly, there is a need for a composition having a property of desorbing hydrocarbons slowly with respect to an increase in temperature.

Patent Literature 1 proposes an HC adsorbent including a hydrocarbon adsorbent material formed of at least one metal among alkali metals and alkaline earth metals; Ag; and a molecular sieve.

CITATION LIST

Patent Literature

PTL 1: Japanese Unexamined Patent Application Publication No. 7-185326

SUMMARY OF INVENTION

Technical Problem

According to Patent Literature 1, an improvement in a hydrocarbon desorption start temperature is observed. However, there is a problem in that once the desorption start temperature is reached, hydrocarbons are desorbed rapidly (i.e., a hydrocarbon desorption temperature range is narrow), and, therefore, an increased load is imposed on the three-way catalyst, which is located downstream.

Solution to Problem

The present inventors studied hydrocarbon adsorption properties (e.g., a hydrocarbon desorption temperature range) of various types of zeolite compositions. As a result, it was discovered that specific compositions have a property of desorbing hydrocarbons slowly (having a wide hydrocarbon desorption temperature range) after a hydrocarbon desorption start temperature is reached.

Specifically, the present invention is as described in the claims, and a summary of the present disclosure is as follows.

[1] A composition comprising an alkali metal and a zeolite having a YFI structure, characterized in that a content of the alkali metal is 1 to 40 mass % based on a total mass of the composition, and a content of the zeolite having a YFI structure is 99 to 60 mass % based on the total mass of the composition.

[2] The composition according to [1], wherein the alkali metal is at least one selected from a group of lithium, sodium, potassium, rubidium and cesium.

[3] The composition according to [1] or [2], wherein the alkali metal is rubidium and/or cesium.

[4] The composition according to any one of [1] to [3], wherein the alkali metal is cesium.

[5] The composition according to any one of [1] to [4], wherein the zeolite having a YFI structure is a zeolite having a YFI structure that has a molar ratio of silica to alumina ($SiO_2/Al_2O_3$) of 5 or more and 400 or less.

[6] The composition according to any one of [1] to [5], wherein the zeolite having a YFI structure is a zeolite having a YFI structure that has a molar ratio of silica to alumina ($SiO_2/Al_2O_3$) of 5 or more and 100 or less.

[7] A hydrocarbon adsorbent comprising the composition according to any one of [1] to [6].

[8] A method for adsorbing a hydrocarbon, the method comprising using the hydrocarbon adsorbent according to [7].

Advantageous Effects of Invention

With the present disclosure, it is possible to provide a composition that desorbs hydrocarbons slowly (has a wide hydrocarbon desorption temperature range) after a hydrocarbon desorption start temperature is reached.

DESCRIPTION OF EMBODIMENTS

A composition of the present disclosure will be described below with reference to an exemplary embodiment. Note that in the present disclosure, when "to" is used to indicate a range, the number preceding "to" and the number following "to" are included in the range. For example, "1 to 40%" is synonymous with "1% or more and 40% or less".

The composition of the present disclosure is a composition in which an alkali metal is present in an amount of 1 to 40 mass %, and a zeolite having a YFI structure is present in an amount of 99 to 60 mass %, based on the total mass of the composition (taken as 100 mass %). From the standpoint of superiority in the property of desorbing hydrocarbons slowly, it is preferable that the composition of the present disclosure be a composition in which an alkali metal is present in an amount of 2 to 40 mass % based on the total mass of the composition, and a zeolite having a YFI structure is present in an amount of 98 to 60 mass % based on the total mass of the composition. More preferably, the composition of the present disclosure is a composition in which an alkali metal is present in an amount of 5 to 40 mass % based on the total mass of the composition, and a zeolite having a YFI structure is present in an amount of 95 to 60 mass % based on the total mass of the composition, and even more preferably, a composition in which an alkali metal is present in an amount of 10 to 40 mass % based on the total mass of the composition, and a zeolite having a YFI structure is present in an amount of 90 to 60 mass % based on the total mass of the composition. Hydrocarbon adsorbents including the composition of the present disclosure have high heat resistance and allow slow desorption of hydrocarbons with respect to a temperature.

In the present disclosure, the zeolite is a compound having a regular structure in which framework atoms (hereinafter also referred to as "T atoms") are disposed with interposed oxygen (O), and the T atoms are at least one of the following: metal atoms, metalloid atoms and atoms other than the foregoing atoms. Examples of the metal atoms include atoms of at least one selected from a group of iron (Fe), aluminum (Al), gallium (Ga), tin (Sn) and titanium (Ti), boron (B) atoms and atoms of a different transition metal element. Examples of the metalloid atoms include atoms of at least one selected from a group of boron (B), silicon (Si), germanium (Ge), arsenic (As), antimony (Sb) and tellurium (Te). Examples of the atoms other than the foregoing atoms include phosphorus (P) atoms.

The zeolite of the present disclosure may be formed of an aluminosilicate or may be formed of a metallosilicate, such as a ferrosilicate or a gallosilicate, or a zeolite analogue, such as a silicoaluminophosphate (SAPO) or an aluminophosphate (AlPO).

Preferably, the zeolite having a YFI structure that is included in the composition of the present disclosure is a crystalline aluminosilicate having a YFI structure. The crystalline aluminosilicate has a crystal structure formed of repeating networks containing aluminum (Al) and silicon (Si) with interposed oxygen (O).

The "framework structure" (which is used herein interchangeably with "crystal structure" and may hereinafter also be referred to as a "zeolite structure") of the zeolite is a framework structure determined according to the structure code specified by the Structure Commission of the International Zeolite Association (hereinafter also referred to simply as a "structure code"). The framework structure can be identified by comparing an XRD pattern of a zeolite of interest against XRD patterns of zeolite structures shown in Collection of Simulated XRD Powder Patterns for Zeolites, Fifth Revised Edition (2007) (hereinafter also referred to as "reference patterns").

In the present disclosure, the XRD pattern may be an XRD pattern obtained from an XRD measurement performed under the following conditions.

Acceleration current and voltage: 40 mA and 40 kV
Radiation source: CuKα radiation (2=1.5405 Å)
Measurement mode: continuous scanning
Scanning condition: 40°/minute
Measurement range: 20=3° to 43°
Vertical divergence limiting slit: 10 mm
Divergence/entrance slit: 1°
Receiving slit: open
Receiving solar slit: 5° Detector: semiconductor detector (D/tex Ultra)
Ni filter used The zeolite structure of the zeolite included in the composition of the present disclosure is a YFI structure. In the present disclosure, a zeolite having a specific zeolite structure is also referred to as a " . . . type zeolite". For example, a zeolite having a YFI structure, preferably a zeolite having only a YFI structure, is also referred to as a "YFI-type zeolite".

The composition of the present disclosure includes an alkali metal. The alkali metal may be at least one selected from a group of lithium, sodium, potassium, rubidium, cesium and francium or may be at least one selected from a group of sodium, potassium, rubidium and cesium. Preferably, the alkali metal that is included in the composition of the present disclosure is at least one selected from a group of lithium, sodium, potassium, rubidium and cesium, and more preferably, rubidium and/or cesium (i.e., at least one of rubidium and cesium). It is even more preferable that the alkali metal be cesium, from the standpoint of a high level of durability of the composition of the present disclosure in a high-temperature and high-humidity environment. Furthermore, from the standpoint of availability at low cost, it is preferable that the alkali metal be at least one of sodium and potassium. The alkali metal may be two or more alkali metals, which are preferably two or more selected from a group of lithium, sodium, potassium, rubidium and cesium and more preferably two or more selected from a group of sodium, potassium, rubidium and cesium. Rubidium and cesium are preferable.

The alkali metal that is included in the composition of the present disclosure is not particularly limited. Examples of the alkali metal include an alkali metal already present in a zeolite derived from a hydrothermal synthesis, which is described later, (resulting from a crystallization step); an alkali metal incorporated into the zeolite by an impregnation treatment; an alkali metal incorporated into the zeolite by an additional impregnation treatment of the zeolite with the alkali metal; and an alkali metal incorporated into a zeolite by first performing ion exchange thereon with hydrogen ions or ammonium ions and thereafter performing an impregnation treatment thereon with the alkali metal.

Note that the alkali metal mentioned above is an alkali metal element, and the state of the element is not particularly limited; preferably, the alkali metal is in an ionic state.

In the present disclosure, the amount of the alkali metal can be measured by inductively coupled plasma emission spectroscopy (ICP-AES).

The zeolite having a YFI structure (YFI-type zeolite) that is included in the composition of the present disclosure has a molar ratio of silica to alumina (hereinafter also referred to as a "$SiO_2/Al_2O_3$ ratio") of, for example, 5 or more and 400 or less. It is preferable that the molar ratio be 5 or more and 200 or less, from the standpoint of superiority in the property of desorbing hydrocarbons slowly. The molar ratio is more preferably 5 or more and 100 or less and particularly preferably 5 or more and 50 or less.

The YFI-type zeolite has a BET specific surface area of, for example, 200 $m^2/g$ or more and 800 $m^2/g$ or less, which is preferable from the standpoint of superiority in the property of desorbing hydrocarbons slowly. The BET specific surface area is more preferably 300 $m^2/g$ or more and 700 $m^2/g$ or less.

It is preferable that the YFI-type zeolite have an XRD pattern containing at least the following XRD peaks.

TABLE 1

| Lattice spacing d (Å) | Relative intensity (%) |
|---|---|
| 12.5 ± 0.6 | 5 to 75 |
| 5.39 ± 0.10 | 15 to 85 |
| 4.36 ± 0.07 | 5 to 75 |
| 4.06 ± 0.07 | 30 to 130 |
| 3.63 ± 0.07 | 30 to 130 |
| 3.43 ± 0.07 | 100 |

*The relative intensity is a relative value with respect to the peak intensity at d = 3.43 ± 0.07 Å.

In the present disclosure, it is sufficient that the XRD pattern contain the peaks shown in the table above, and it is also possible that the XRD pattern may contain a different peak.

More preferably, the YFI-type zeolite contains at least the following XRD peaks.

TABLE 2

| Lattice spacing d (Å) | Relative intensity (%) |
|---|---|
| 15.7 ± 0.8 | 1 to 25 |
| 12.5 ± 0.6 | 5 to 75 |
| 9.82 ± 0.4 | 1 to 40 |
| 9.10 ± 0.4 | 3 to 50 |
| 5.39 ± 0.10 | 15 to 85 |
| 4.36 ± 0.07 | 5 to 75 |
| 4.06 ± 0.07 | 30 to 130 |
| 3.63 ± 0.07 | 30 to 130 |
| 3.43 ± 0.07 | 100 |
| 3.15 ± 0.07 | 10 to 80 |

*The relative intensity is a relative value with respect to the peak intensity at d = 3.43 ± 0.07 Å.

The composition of the present disclosure may include one or more components other than those described above. Examples of the components other than those described above include, but are not limited to, binders.

Now, a method for producing the composition of the present disclosure will be described.

The composition of the present disclosure can be obtained by using a production method including a crystallization step in which a composition containing a silica source, an alumina source, an alkali source and water (hereinafter also referred to as a "raw material composition") is crystallized; and an alkali metal incorporation step in which an alkali metal is incorporated. This production method also corresponds to a method for producing the YFI-type zeolite that is included in the composition of the present disclosure. Note that in the crystallization step, a structure directing agent (hereinafter also referred to as an "SDA") may be additionally used, if necessary. From the standpoint of simplifying production operation, it is preferable not to use any SDA, and from the standpoint of extending a production control limit, it is preferable to use an SDA.

The silica source is at least one of silica and a precursor thereof. For example, the silica source may be at least one from the group consisting of colloidal silica, amorphous silica, sodium silicate, tetraethyl orthosilicate and an aluminosilicate gel. In particular, the silica source is preferably colloidal silica or amorphous silica.

The alumina source is at least one of alumina and a precursor thereof. For example, the alumina source may be at least one from the group consisting of aluminum nitrate, aluminum sulfate, sodium aluminate, aluminum hydroxide, aluminum chloride, an aluminosilicate gel and metal aluminum. In particular, the alumina source is preferably aluminum hydroxide or aluminum sulfate.

The alkali source may be, for example, at least one from the group consisting of various salts, such as hydroxides, halides and carbonate salts of lithium, sodium, potassium, rubidium, cesium, francium, magnesium, calcium, strontium or ammonium. In particular, the alkali source is preferably a hydroxide of sodium, potassium or ammonium.

The structure directing agent (SDA) may be a dimethyldipropylammonium salt (hereinafter also referred to as "$MezPr_2N^+$"). Examples of the dimethyldipropylammonium salt include, but are not limited to, dimethyldipropylammonium hydroxide, dimethyldipropylammonium chloride and dimethyldipropylammonium bromide.

In the method for producing the YFI-type zeolite of the present disclosure, it is desirable that a seed crystal of a zeolite be further added to the raw material composition. The use of a seed crystal accelerates the crystallization of the zeolite, which shortens the time for the production of the zeolite and improves the yield.

It is desirable that the seed crystal of the zeolite be a seed crystal of a zeolite that is an aluminosilicate having an LTL structure, an LTA structure, an MOR structure, an MFI structure, a BEA structure, an FAU structure, a CHA structure or a YFI structure.

The $SiO_2/Al_2O_3$ molar ratio of the seed crystal of the zeolite is desirably 2 to 100 and more desirably 3 to 60.

It is desirable that an amount of addition of the seed crystal of the zeolite be small. However, in terms of a reaction rate, an impurity-inhibiting effect and the like, it is desirable that the amount of addition be 0.1 to 60 mass % relative to a mass of the silica component included in the raw material composition. More desirably, the amount of addition is 0.5 to 40 mass %.

The content of the seed crystal (hereinafter also referred to as the "seed crystal content") in the raw material composition can be determined as follows: seed crystal content (mass %)=(mass of $SiO_2$ of zeolite)/(mass of $SiO_2$ in the raw material composition as a whole)×100, provided that the mass of the silicon (Si) included in the raw material composition is calculated as $SiO_2$.

A preferred composition of the raw material composition is the following composition, for example.

$SiO_2/Al_2O_3$ molar ratio=10 or more and 50 or less
$Me_2Pr_2N^+/SiO_2$ molar ratio=0.05 or more and 0.30 or less
$Na/SiO_2$ molar ratio=0.05 or more and 0.30 or less
$K/SiO_2$ molar ratio=0.05 or more and 0.30 or less
$H_2O/SiO_2$ molar ratio=3 or more and 50 or less Preferably, the crystallization step uses a hydrothermal treatment to crystallize the raw material composition. The conditions for the hydrothermal treatment are not particularly limited, and examples of the conditions include the following conditions.

Crystallization temperature: 140° C. or higher and 180° C. or less
Crystallization time: 1 day to 10 days
Crystallization pressure: autogenous pressure This crystallization step crystallizes the raw material composition to yield a YFI-type zeolite. After the crystallization step, the resulting YFI-type zeolite may be subjected to the steps of collection, washing, drying and calcination that are performed with any method, and in addition, a dealumination treatment may be performed to achieve a desired value of the $SiO_2/Al_2O_3$ ratio.

In instances where a raw material composition containing an SDA is crystallized, it is preferable, from the standpoint of superiority in the property of desorbing hydrocarbons slowly, that the YFI-type zeolite be subjected to a calcination step after the crystallization step, to remove the SDA from the YFI-type zeolite.

The calcination step is a step for removing the SDA from the zeolite. The conditions for the calcination are not limited, and examples of the conditions for the calcination include an oxidizing atmosphere, a calcination temperature of 400° C. or higher and 800° C. or lower and a calcination time of 0.5 hours or more and 12 hours or less.

The alkali metal incorporation step is a step for contacting an alkali metal with the YFI-type zeolite obtained in the crystallization step, thereby incorporating the alkali metal into the zeolite. In the present disclosure, in the alkali metal incorporation step, the alkali metal is incorporated in a manner that intentionally creates a state in which the alkali metal is not coordinated at some of the ion exchange sites (alkali metal coordination sites) of the YFI-type zeolite. As a result, at least a portion of the alkali metal included in the resulting composition can be in an ionic state.

The alkali metal to be incorporated is not particularly limited and may be at least one selected from a group of lithium, sodium, potassium, rubidium, cesium and francium. The alkali metal may be at least one selected from a group of sodium, potassium, rubidium and cesium or may be sodium, potassium, rubidium or cesium. From the standpoint of superiority in the property of desorbing hydrocarbons slowly, rubidium or cesium is preferable, and cesium is more preferable. The alkali metal may be two or more alkali metals, and examples thereof include at least one from the group consisting of sodium, potassium, rubidium and cesium; at least one of rubidium or cesium is preferable, and cesium is more preferable.

In instances where lithium, sodium, potassium, rubidium, cesium or francium is to be incorporated into the zeolite, it is preferable to use a compound of lithium, sodium, potassium, rubidium, cesium or francium, and it is more preferable to use an inorganic salt containing lithium, sodium, potassium, rubidium, cesium or francium or use at least one from the group consisting of sulfate salts, nitrate salts, acetate salts and chlorides that contain lithium, sodium, potassium, rubidium, cesium or francium.

It is sufficient that the alkali metal incorporation step be a method that incorporates an alkali metal into at least one of the ion exchange sites and the pores, of the zeolite. Specifically, the method may be at least one from the group consisting of ion exchange, evaporation to dryness and incipient wetness impregnation; preferably, the method is incipient wetness impregnation, particularly, a method in which an aqueous solution containing an alkali metal compound is mixed with the zeolite (when the method for incorporation in the alkali metal incorporation step is an impregnation method, such as incipient wetness impregnation, the step is also referred to as an "alkali metal impregnation step").

Note that, preferably, in the alkali metal incorporation step, the alkali metal is incorporated in a manner that intentionally creates a state in which the alkali metal is not coordinated at some of the ion exchange sites (alkali metal coordination sites) of the YFI-type zeolite. Methods therefor are not particularly limited, and examples of the methods include the method described in the Examples section of the present disclosure (a method in which the zeolite is used as a fixed bed, and a solution of an alkali metal is passed through the fixed bed to incorporate the alkali metal).

Note that the production method of the present disclosure may include at least one of a washing step, a drying step or an activation step, which is performed after the alkali metal incorporation step.

The washing step after the alkali metal incorporation step is intended to remove impurities and the like from the YFI-type zeolite and may use any washing method. For example, a YFI-type zeolite impregnated with an alkali metal may be washed with a sufficient amount of purified water.

The drying step after the alkali metal incorporation step is intended to remove water, and the process (drying) may be performed, for example, in air at a temperature of 100° C. or higher and 200° C. or lower or preferably a temperature of 110° C. or higher and 190° C. or lower. The process time is not limited and may be, for example, 1 hour or more and 2 hours or less.

The activation step after the alkali metal incorporation step is a step of removing organic matter from the YFI-type zeolite, and the process (activation) may be performed, for example, in air at a temperature of higher than 200° C. and 600° C. or lower or preferably in air at a temperature of higher than 300° C. and 600° C. or lower. The process time is not limited and may be, for example, 1 hour or more and 2 hours or less.

The composition of the present disclosure can be used as a hydrocarbon adsorbent including the composition. The hydrocarbon adsorbent can be used in a method for adsorbing hydrocarbons.

The hydrocarbon adsorbent of the present disclosure may have any shape depending on the intended use. Preferably, the hydrocarbon adsorbent may be at least one of a powder or a molded body. A specific shape of the molded body may be at least one from the group consisting of spherical shapes, generally spherical shapes, elliptical shapes, disc shapes, cylindrical shapes, polyhedral shapes, irregular shapes and petaloid shapes.

In instances where the hydrocarbon adsorbent is employed as a powder, the hydrocarbon adsorbent may be mixed with a solvent, such as water or alcohol, to form a slurry, and the slurry may be coated onto a substrate to form an adsorbent member.

In instances where the hydrocarbon adsorbent of the present disclosure is used as a molded body, the hydrocarbon adsorbent may be mixed with a binder, if necessary, and may be molded with any method. Preferably, the binding agent may be, for example, at least one from the group consisting of silica, alumina, kaolin, attapulgite, montmorillonite, bentonite, alloene and sepiolite. A method for the molding may be, for example, at least one from the group consisting of tumbling granulation, press molding, extrusion molding, injection molding, slip casting and sheet molding. The hydrocarbon adsorbent of the present disclosure can adsorb hydrocarbons with a method including a step of contacting a hydrocarbon-containing fluid with the hydrocarbon adsorbent of the present disclosure.

The hydrocarbon-containing fluid may be, for example, a hydrocarbon-containing gas or a hydrocarbon-containing liquid.

The hydrocarbon-containing gas is a gas containing at least one hydrocarbon and preferably a gas containing two or more hydrocarbons. The hydrocarbon present in the hydrocarbon-containing gas may be at least one from the group consisting of paraffins, olefins and aromatic hydrocarbons. It is sufficient that the number of carbon atoms of the hydrocarbon be 1 or more. Preferably, the number of carbon atoms is 1 or more and 15 or less. Preferably, the hydrocarbon present in the hydrocarbon-containing gas is at least two from the group consisting of methane, ethane, ethylene, propylene, butane, linear paraffins having 5 or more carbon atoms, linear olefins having 5 or more carbon atoms, benzene, toluene and xylene. The hydrocarbon is preferably at least two from the group consisting of methane, ethane, ethylene, propylene, butane, benzene, toluene and xylene and more preferably at least one from the group consisting of methane, ethane, ethylene and propylene and at least one from the group consisting of benzene, toluene and xylene. The hydrocarbon-containing gas may contain at least one from the group consisting of carbon monoxide, carbon dioxide, hydrogen, oxygen, nitrogen, nitrogen oxides, sulfur oxides and water. Specific examples of the hydrocarbon-containing gas include combustion gases, such as exhaust gases from internal combustion engines.

Preferably, a contact temperature for the step is room temperature to 200° C.

EXAMPLES

The present disclosure will be described in more detail below with reference to examples. The present disclosure is not limited to the examples.
(Determination of Crystal Structure)

An XRD measurement was performed on a sample with a typical X-ray diffractometer (instrument name: Ultima IV Protectus, manufactured by Rigaku Corporation) under the following conditions.

Acceleration current and voltage: 40 mA and 40 kV
Radiation source: CuKα radiation (λ=1.5405 Å)
Measurement mode: continuous scanning (2θ/θ scanning)
Scanning condition: 40°/minute
Measurement range: 2θ=3° to 43°
Vertical divergence limiting slit: 10 mm
Divergence/entrance slit: 1°
Receiving slit: open
Receiving solar slit: 5° Detector: semiconductor detector (D/tex Ultra)
Ni filter used The obtained XRD pattern was compared against reference patterns to determine the crystal structure.
(Composition Analysis)

A sample solution was prepared by dissolving the sample into a mixed aqueous solution of hydrofluoric acid and nitric acid. The sample solution was measured by inductively coupled plasma emission spectroscopy (ICP-AES) with a typical ICP instrument (instrument name: Optima 5300 DV, manufactured by PerkinElmer, Inc.). From the obtained measured values of Si, Al and the alkali metal (e.g., Cs and Na), the $SiO_2/Al_2O_3$ molar ratio of the sample and the mass percentage of the alkali metal were determined.

Example 1

(Synthesis of Zeolite Having YFI Structure)

A raw material composition having the following molar composition was obtained by mixing together a colloidal silica AS-40 (manufactured by Grace), a Y-type zeolite (product name: HSZ-350HOA, manufactured by Tosoh Corporation), $Me_2Pr_2NOH$, NaOH, KOH and $H_2O$.

$SiO_2/Al_2O_3/Me_2Pr_2NOH/NaOH/KOH/H_2O$=1/0.025/ 0.17/0.15/0.17/7 (molar ratio), that is, $SiO_2/Al_2O_3$ molar ratio=40
$Me_2Pr_2N^+/SiO_2$ molar ratio=0.17
$Na/SiO_2$ molar ratio=0.15
$K/SiO_2$ molar ratio=0.17
$H_2O/SiO_2$ molar ratio=7

The obtained raw material composition was loaded into an autoclave and left under static conditions at 160° C. for 6 days to be crystallized. After the crystallization, the resultant was calcined in air at 550° C. for 2 hours to form a calcined product. The calcined product was mixed with a 20% aqueous solution of ammonium chloride, which was used in an amount such that a large excess of $NH_4$, namely, in an amount of 30 molar equivalents relative to the amount of Al of the calcined product, was present. The mixed aqueous solution was subjected to a stirring and mixing process in which an operation of stirring the mixed aqueous solution at 80° C. for 24 hours and subsequently filtering the mixed solution was performed twice. Subsequently, the resultant was dried in air at 110° C. overnight. In this manner, a YFI-type zeolite in which $SiO_2/Al_2O_3$ was 18, and the type of the cation was $NH_4$ was obtained. The concentrations of Na and K in the obtained YFI-type zeolite were less than or equal to the detection limits.

(Impregnation of Alkali Metal (Cs))

A 2 mass % aqueous solution of cesium chloride was prepared with cesium chloride (manufactured by Fujifilm Wako Pure Chemical Corporation (special grade)). For the incorporation (impregnation) of the alkali metal, the aqueous solution of cesium chloride was used in an amount such that the alkali metal (Cs) was present in an amount (mol) of 4 equivalents relative to an amount (mol) of Al of the obtained YFI-type zeolite of a $NH_4$-type.

The impregnation was carried out as follows. The obtained YFI-type zeolite was mixed with water in advance, and subsequently, the mixture was filtered through a funnel to yield a cake of the obtained zeolite. The aqueous solution of cesium chloride was passed through the cake, and subsequently, water at 60° C. in an amount 10 times that of the obtained YFI-type zeolite was passed through the cake to wash the cake. After the washing, the cake was dried at 110° C. in air to carry out the impregnation of the alkali metal (Cs). Accordingly, a composition of the present Example was obtained. ICP analysis was performed on the obtained composition to determine a content (mass %) of the alkali metal (Cs, in the present Example) in the composition.

Example 2

The crystallized product (calcined product) resulting from the calcination in air at 550° C., described in Example 1, was mixed with 0.5 N hydrochloric acid in an amount 30 times by mass the amount of the crystallized product. The mixture was left with stirring at room temperature for 1 hour and then filtered and washed. Subsequently, as in Example 1, the resultant was subjected to a stirring and mixing process that used a 20% aqueous solution of ammonium chloride and was thereafter dried in air at 110° C. overnight. In this manner, a YFI-type zeolite in which $SiO_2/Al_2O_3$ was 32, and the type of the cation was $NH_4$ was obtained.

Furthermore, the impregnation of an alkali metal (Cs) was carried out in a manner similar to that of Example 1. Accordingly, a composition of the present Example was obtained. The content (mass %) of the alkali metal (Cs, in the present Example) in the composition was determined.

Example 3

A raw material composition, described below, was obtained in a manner similar to that of Example 1, except that the composition of the raw material composition was the following molar composition.

$SiO_2/Al_2O_3$ molar ratio=30
$Me_2Pr_2N^+/SiO_2$ molar ratio=0.13
$Na/SiO_2$ molar ratio=0.158
$K/SiO_2$ molar ratio=0.165
$H_2O/SiO_2$ molar ratio=7

The obtained raw material composition was loaded into an autoclave and left under static conditions at 160° C. for 42 hours to be crystallized. The resultant was calcined in air at 550° C. to form a calcined product. The calcined product was subjected to a stirring and mixing process that used a 20% aqueous solution of ammonium chloride and was thereafter dried in air at 110° C. overnight. In this manner, a YFI-type zeolite in which $SiO_2/Al_2O_3$ was 18.0, and the type of the cation was $NH_4$ was obtained.

An impregnation treatment with Cs was performed in a manner similar to that of Example 1. Accordingly, a YFI-type zeolite in which $SiO_2/Al_2O_3$ was 18.0, and the type of the cation was Cs was obtained and designated as a composition of the present Example.

Example 4

A raw material composition, described below, was obtained in a manner similar to that of Example 1, such that the composition of the raw material composition became the following molar composition.

$SiO_2/Al_2O_3/Me_2Pr_2NOH/NaOH/KOH/H_2O=1/0.0269/0.17/0.15/0.16/7.25$ (molar ratio)

$SiO_2/Al_2O_3$ molar ratio=37.2
$Me_2Pr_2N^+/SiO_2$ molar ratio=0.17
$Na/SiO_2$ molar ratio=0.15
$K/SiO_2$ molar ratio=0.16
$H_2O/SiO_2$ molar ratio=7.25

The obtained raw material composition was loaded into an autoclave and rotated at 250 rpm at 160° C. for 36 hours to be crystallized. The resultant was calcined in air at 550° C. to form a calcined product. The calcined product was subjected to a stirring and mixing process that used a 20% aqueous solution of ammonium chloride and was thereafter dried in air at 110° C. overnight. In this manner, a YFI-type zeolite in which $SiO_2/Al_2O_3$ was 19.1, and the type of the cation was $NH_4$ was obtained.

An impregnation treatment with Cs was performed in a manner similar to that of Example 1. Accordingly, a YFI-type zeolite in which $SiO_2/Al_2O_3$ was 19.1, and the type of the cation was Cs was obtained and designated as a composition of the present Example.

Example 5

A calcined product obtained in a manner similar to that of Example 4 was mixed with 0.34 N hydrochloric acid in an amount 5.7 times by mass the amount of the calcined product. The mixture was stirred at room temperature for 1 hour and then filtered and washed. Subsequently, as in Example 1, the resultant was subjected to a stirring and mixing process that used a 20% aqueous solution of ammonium chloride and was thereafter dried in air at 110° C. overnight. In this manner, a YFI-type zeolite in which $SiO_2/Al_2O_3$ was 24.4, and the type of the cation was $NH_4$ was obtained.

An impregnation treatment with Cs was performed in a manner similar to that of Example 1. Accordingly, a YFI-type zeolite in which $SiO_2/Al_2O_3$ was 24.4, and the type of the cation was Cs was obtained and designated as a composition of the present Example.

Example 6

A calcined product obtained in a manner similar to that of Example 4 was mixed with 1.02 N hydrochloric acid in an amount 5.7 times by mass the amount of the calcined product. The mixture was left with stirring at room temperature for 18 hours and then filtered and washed. Subsequently, as in Example 1, the resultant was subjected to a stirring and mixing process that used a 20% aqueous solution of ammonium chloride and was thereafter dried in air at 110° C. overnight. In this manner, a YFI-type zeolite in which $SiO_2/Al_2O_3$ was 41.3, and the type of the cation was $NH_4$ was obtained.

An impregnation treatment with Cs was performed in a manner similar to that of Example 1. Accordingly, a YFI-type zeolite in which $SiO_2/Al_2O_3$ was 41.3, and the type of the cation was Cs was obtained and designated as a composition of the present Example.

Example 7

A calcined product obtained in a manner similar to that of Example 4 was mixed with 2.37 N hydrochloric acid in an amount 4 times by mass the amount of the calcined product. The mixture was left with stirring at 55° C. for 18 hours and then filtered and washed. Subsequently, as in Example 1, the resultant was subjected to a stirring and mixing process that used a 20% aqueous solution of ammonium chloride and was thereafter dried in air at 110° C. overnight. In this manner, a YFI-type zeolite in which $SiO_2/Al_2O_3$ was 58.0, and the type of the cation was $NH_4$ was obtained.

An impregnation treatment with Cs was performed in a manner similar to that of Example 1. Accordingly, a YFI-type zeolite in which $SiO_2/Al_2O_3$ was 58.0, and the type of the cation was Cs was obtained and designated as a composition of the present Example.

Example 8

A calcined product obtained in a manner similar to that of Example 4 was mixed with 3.39 N hydrochloric acid in an amount 4 times by mass the amount of the calcined product. The mixture was left with stirring at 55° C. for 18 hours and then filtered and washed. Subsequently, as in Example 1, the resultant was subjected to a stirring and mixing process that used a 20% aqueous solution of ammonium chloride and was thereafter dried in air at 110° C. overnight. In this manner, a YFI-type zeolite in which $SiO_2/Al_2O_3$ was 91.0, and the type of the cation was $NH_4$ was obtained.

An impregnation treatment with Cs was performed in a manner similar to that of Example 1. Accordingly, a YFI-type zeolite in which $SiO_2/Al_2O_3$ was 91.0, and the type of the cation was Cs was obtained and designated as a composition of the present Example.

Example 9

A YFI-type zeolite in which $SiO_2/Al_2O_3$ was 19.1, and the type of the cation was Cs was obtained and designated as a composition of the present Example. The YFI-type zeolite was obtained in a manner similar to that of Example 1, except that a YFI-type zeolite obtained in a manner similar to that of Example 4 was used, and, for the impregnation of the alkali metal, the solution was used in an amount such that the alkali metal (Cs) was present in an amount (mol) of 0.75 equivalents.

Example 10

A YFI-type zeolite in which $SiO_2/Al_2O_3$ was 19.1, and the type of the cation was Cs was obtained and designated as a composition of the present Example. The YFI-type zeolite was obtained by performing a Cs impregnation treatment as in Example 1, except that a YFI-type zeolite obtained in a manner similar to that of Example 4 was used, and, for the impregnation of the alkali metal, the solution was used in an amount such that the alkali metal (Cs) was present in an amount (mol) of 0.5 equivalents.

Example 11

A YFI-type zeolite in which $SiO_2/Al_2O_3$ was 19.1, and the type of the cation was Cs was obtained and designated as a composition of the present Example. The YFI-type zeolite was obtained by performing a Cs impregnation treatment as in Example 1, except that a YFI-type zeolite obtained in a manner similar to that of Example 4 was used, and, for the impregnation of the alkali metal, the solution was used in an amount such that the alkali metal (Cs) was present in an amount (mol) of 0.25 equivalents.

Example 12

A YFI-type zeolite in which $SiO_2/Al_2O_3$ was 19.1, and the type of the cation was Li was obtained and designated as a composition of the present Example. The YFI-type zeolite was obtained by performing a Li impregnation treatment as in Example 1, except that a YFI-type zeolite obtained in a manner similar to that of Example 4 was used, and, for the impregnation of the alkali metal, a 10 mass % aqueous solution of lithium chloride (manufactured by Kanto Chemical Co., Inc.), instead of cesium chloride, was used in an amount such that the alkali metal (Li) was present in an amount (mol) of 50 equivalents.

Example 13

A YFI-type zeolite in which $SiO_2/Al_2O_3$ was 19.1, and the type of the cation was Na was obtained and designated as a composition of the present Example. The YFI-type zeolite was obtained by performing a Na impregnation treatment as in Example 1, except that a YFI-type zeolite obtained in a manner similar to that of Example 4 was used, and, for the impregnation of the alkali metal, a 10 wt % aqueous solution of sodium chloride (manufactured by Fujifilm Wako Pure Chemical Corporation), instead of cesium chloride, was used in an amount such that the alkali metal (Na) was present in an amount (mol) of 50 equivalents.

Example 14

A YFI-type zeolite in which $SiO_2/Al_2O_3$ was 19.1, and the type of the cation was K was obtained and designated as a composition of the present Example. The YFI-type zeolite was obtained by performing a K impregnation treatment as in Example 1, except that a YFI-type zeolite obtained in a manner similar to that of Example 4 was used, and, for the impregnation of the alkali metal, a 2 mass % aqueous solution of potassium chloride (manufactured by Kanto Chemical Co., Inc.), instead of cesium chloride, was used in an amount such that the alkali metal (K) was present in an amount (mol) of 10 equivalents.

Example 15

A YFI-type zeolite in which $SiO_2/Al_2O_3$ was 19.1, and the type of the cation was Rb was obtained and designated as a composition of the present Example. The YFI-type zeolite was obtained by performing a Rb impregnation treatment as in Example 1, except that a YFI-type zeolite obtained in a manner similar to that of Example 4 was used, and, for the impregnation of the alkali metal, a 2 mass % aqueous solution of rubidium chloride (manufactured by Kanto Chemical Co., Inc.), instead of cesium chloride, was used in an amount such that the alkali metal (Rb) was present in an amount (mol) of 2 equivalents.

Comparative Example 1

The YFI-type zeolite of Example 1 in which $SiO_2/Al_2O_3$ was 18, and the type of the cation was $NH_4$ was replaced with an MFI-type zeolite (product name: HSZ-840NHA, manufactured by Tosoh Corporation) (that is, the impregnation treatment with cesium was not performed, and the MFI-type zeolite was used as a composition of the present Comparative Example). The composition of the present Comparative Example had an alkali metal content of 0 mass %.

Comparative Example 2

A composition of the present Comparative Example was obtained in a manner similar to that of Example 4, except that the impregnation treatment with Cs was not performed.

Comparative Example 3

A Cs-containing MFI-type zeolite was obtained in a manner similar to that of Example 1, except for the following differences, and designated as a composition of the present Comparative Example. The differences were that the YFI-type zeolite of Example 1 in which $SiO_2/Al_2O_3$ was 18, and the type of the cation was $NH_4$ was replaced with an MFI-type zeolite (product name: HSZ-840NHA, manufactured by Tosoh Corporation), and an impregnation treatment with cesium was performed on the MFI-type zeolite.

Measurement Example 1

(Preparation and Pretreatment of Measurement Sample)

The compositions obtained in the Examples and the Comparative Examples were each used as a hydrocarbon adsorbent. Each of the hydrocarbon adsorbents of the Examples and the Comparative Examples was pressure-molded and ground to form an irregular-shaped molded body having an aggregate size of 20 to 30 mesh. The resulting molded bodies were each designated as a measurement sample of the Example or the Comparative Example. A pretreatment was performed as follows. 1 g of each of the measurement samples was loaded into a normal-pressure fixed bed flow reactor and treated at 500° C. for 1 hour under a nitrogen flow, and subsequently, the measurement sample was cooled to 50° C.

(Adsorption of Hydrocarbons)

A hydrocarbon-containing gas was flowed through each of the hydrocarbon adsorbents that had undergone the pretreatment, and adsorbed hydrocarbons were measured over a range of 50° C. to 200° C., to determine an amount of adsorbed hydrocarbons. A composition of the hydrocarbon-containing gas and the measurement conditions are shown below.

Hydrocarbon-containing gas:
    toluene 3000 volume ppmC (equivalent methane concentration)
    Water 3 vol %
    Nitrogen balance
Gas flow rate: 200 mL/minute
Measurement temperature: 50 to 600° C.
Heating rate: 10° C./minute (Measurement of Hydrocarbon Desorption Start Temperature and Desorption Temperature Range)

Hydrocarbons in the gas after the gas passed through the hydrocarbon adsorbent were quantitatively analyzed continuously with a flame ionization detector (FID). The following hydrocarbon concentrations were measured: a hydrocarbon concentration of the hydrocarbon-containing gas on an inlet side of a normal-pressure fixed bed flow reactor (an equivalent methane concentration, hereinafter referred to as an "inlet concentration"); and a hydrocarbon concentration of the hydrocarbon-containing gas on an outlet side of the normal-pressure fixed bed flow reactor (an equivalent methane concentration, hereinafter referred to as an "outlet concentration").

An integral value of the inlet concentrations was designated as an amount of hydrocarbons that passed through the hydrocarbon adsorbent. By determining a value resulting from the subtraction of an integral value of the outlet concentrations (equivalent methane concentrations) from the amount of hydrocarbons, the amount of adsorbed hydrocarbons in each of the adsorbents was determined as an amount of desorbed hydrocarbons per mass of the hydrocarbon adsorbent ($\mu$molC/g).

In general, a temperature of a measurement sample and the amount of desorbed hydrocarbon have a relationship that can be expressed as a convex upward curve such that, in association with the increase in the temperature of the measurement sample, the amount of desorbed hydrocarbons initially increases, and, after a maximum value (hereinafter also referred to as a "maximum amount of desorption") is reached, the amount of desorbed hydrocarbons decreases. The more slowly hydrocarbons are desorbed, the less load is imposed on the three-way catalyst located downstream. Accordingly, the larger the difference between the desorption start temperature and a temperature at which the amount of desorbed hydrocarbon reaches 0 $\mu$molC/g after being reduced in association with the increase in the temperature of the measurement sample (a temperature at which the amount of desorbed hydrocarbon reaches 0 $\mu$molC/g after the maximum amount of desorption is reached) (hereinafter also referred to as "desorption end temperature") (hereinafter, this difference is also referred to as a "desorption temperature range"), the more preferable the hydrocarbon adsorbent. In the present Measurement Example, the desorption temperature range was determined taking into account the accuracy of the measurement system. That is, the temperature at which the amount of desorbed hydrocarbons became 0.3 $\mu$molC/g or less was regarded as the desorption end temperature, and the desorption end temperature minus the desorption start temperature was determined as the desorption temperature range. The results are shown in the table below. In the table below, "Type of Me" and "Me content" mean the type of the alkali metal included in the composition and the content thereof, respectively.

TABLE 3

| | Zeolite structure | Type of Me | Me content (wt %) | SiO$_2$/ Al$_2$O$_3$ ratio | Desorption temperature range (° C.) |
|---|---|---|---|---|---|
| Example 1 | YFI | Cs | 15.05 | 18 | 155 |
| Example 2 | YFI | Cs | 11.32 | 32 | 166 |
| Example 3 | YFI | Cs | 19.78 | 14 | 156 |
| Example 4 | YFI | Cs | 17.05 | 19.1 | 164 |
| Example 5 | YFI | Cs | 12.9 | 24.4 | 149 |
| Example 6 | YFI | Cs | 8.2 | 41.3 | 159 |
| Example 7 | YFI | Cs | 7.38 | 58 | 157 |
| Example 8 | YFI | Cs | 4.8 | 91 | 151 |
| Example 9 | YFI | Cs | 15.45 | 19.1 | 158 |
| Example 10 | YFI | Cs | 10.9 | 19.1 | 152 |

TABLE 3-continued

| | Zeolite structure | Type of Me | Me content (wt %) | SiO$_2$/ Al$_2$O$_3$ ratio | Desorption temperature range (° C.) |
|---|---|---|---|---|---|
| Example 11 | YFI | Cs | 5.38 | 19.1 | 155 |
| Example 12 | YFI | Li | — | 19.1 | 167 |
| Example 13 | YFI | Na | 2.17 | 19.1 | 207 |
| Example 14 | YFI | K | 4.12 | 19.1 | 184 |
| Example 15 | YFI | Rb | — | 19.1 | 179 |
| Comparative Example 1 | MFI | | 0 | 39 | 119 |
| Comparative Example 2 | YFI | | 0 | 19.1 | 140 |
| Comparative Example 3 | MFI | Cs | 10.1 | 39 | 127 |

As is apparent from the table above, the hydrocarbon adsorbents of the Examples exhibited wider desorption temperature ranges than that of the hydrocarbon adsorbent of Comparative Example 1. This indicates that hydrocarbon adsorbents having a YFI structure desorbed hydrocarbons slowly. Furthermore, a comparison between the Examples and Comparative Example 2 indicates that regarding the compositions formed of a YFI-type zeolite, compositions including an alkali metal had a wider desorption temperature range, no matter which of the alkali metals, namely, lithium, sodium, potassium, cesium and rubidium, was included in the YFI-type zeolite.

The entire contents of the specification, claims and abstract of Japanese Patent Application No. 2020-064910, filed on Mar. 31, 2020, is incorporated herein by reference as a disclosure of the specification of the present disclosure.

The invention claimed is:

1. A composition comprising:
   an alkali metal; and
   a zeolite having a YFI structure, wherein
   a content of the alkali metal is 1 to 40 mass % based on a total mass of the composition, and a content of the zeolite having a YFI structure is 99 to 60 mass % based on the total mass of the composition.

2. The composition according to claim 1, wherein the alkali metal is at least one selected from a group of lithium, sodium, potassium, rubidium and cesium.

3. The composition according to claim 1, wherein the alkali metal is rubidium and/or cesium.

4. The composition according to claim 1, wherein the alkali metal is cesium.

5. The composition according to claim 1, wherein the zeolite having a YFI structure is a zeolite having a YFI structure that has a molar ratio of silica to alumina (SiO$_2$/Al$_2$O$_3$) of 5 or more and 400 or less.

6. The composition according to claim 1, wherein the zeolite having a YFI structure is a zeolite having a YFI structure that has a molar ratio of silica to alumina (SiO$_2$/Al$_2$O$_3$) of 5 or more and 100 or less.

7. A hydrocarbon adsorbent comprising the composition according to claim 1.

8. A method for adsorbing a hydrocarbon, the method comprising using the hydrocarbon adsorbent according to claim 7.

* * * * *